Oct. 20, 1942. G. B. WOOD 2,299,368
LOAD PACKER CONSTRUCTION
Filed June 19, 1941 3 Sheets-Sheet 1

INVENTOR
George B. Wood.
BY
Harness, Dickey & Pierce
ATTORNEYS.

Oct. 20, 1942.     G. B. WOOD     2,299,368
LOAD PACKER CONSTRUCTION
Filed June 19, 1941     3 Sheets-Sheet 2

INVENTOR
*George B. Wood.*
BY
*Harness, Dickey & Pierce.*
ATTORNEYS

Oct. 20, 1942.    G. B. WOOD    2,299,368
LOAD PACKER CONSTRUCTION
Filed June 19, 1941    3 Sheets-Sheet 3

INVENTOR
George B. Wood.
BY
ATTORNEYS.

Patented Oct. 20, 1942

2,299,368

UNITED STATES PATENT OFFICE 2,299,368

LOAD PACKER CONSTRUCTION

George B. Wood, Detroit, Mich., assignor to Gar Wood Industries, Inc., Detroit, Mich., a corporation of Michigan Application June 19, 1941, Serial No. 398,832

7 Claims. (Cl. 214—67)

The present invention relates to improvements in material handling devices, and particularly relates to improvements in load packers for refuse trucks.

One of the primary objects of the present invention is to provide improvements in devices of the type mentioned whereby the material being loaded may be handled more quickly than in prior constructions.

Another object of the invention is to provide improvements in devices of the type mentioned whereby the material may be loaded into the receptacle of the truck independently of the position of the packer element, thereby speeding up the truck loading and requiring less effort on the part of the truckman than in prior constructions.

Another object of the invention is to provide improvements in devices of the type mentioned in which the truck may be loaded from either side and independently of the position of the packer element, thereby speeding up the truck loading and requiring less effort on the part of the truckman than in prior constructions.

A further object of the invention is to provide an improved and simplified material injection means which may be constantly operated without interruption in the loading of the refuse and which is so shaped that material loaded into the receiving receptacles falls into such a position in front of the injector that it is readily deposited into the truck.

A further object of the invention is to provide improvements in devices of the type mentioned in which the material being loaded need not be lifted as high for dumping into the truck as required in prior constructions, thereby reducing the effort required on the part of the truckman.

Another object of the invention is to provide a construction in which the ram will not jam and in which any material caught behind the ram may drop to a position in front of the ram when such ram is in its retracted position.

Other objects of the invention will become apparent from the following specification, the drawings relating thereto, and from the claims hereinafter set forth.

In the drawings, in which like numerals are used to designate like parts in the several views throughout:

The present invention is directed particularly to improvements over the type of construction disclosed and claimed in the George B. Wood Patent No. 2,212,058, granted August 20, 1940. The invention is particularly concerned with refuse truck bodies in which the refuse is packed tightly within the truck body so that the load capacity of the body is thereby increased.

Figure 1:
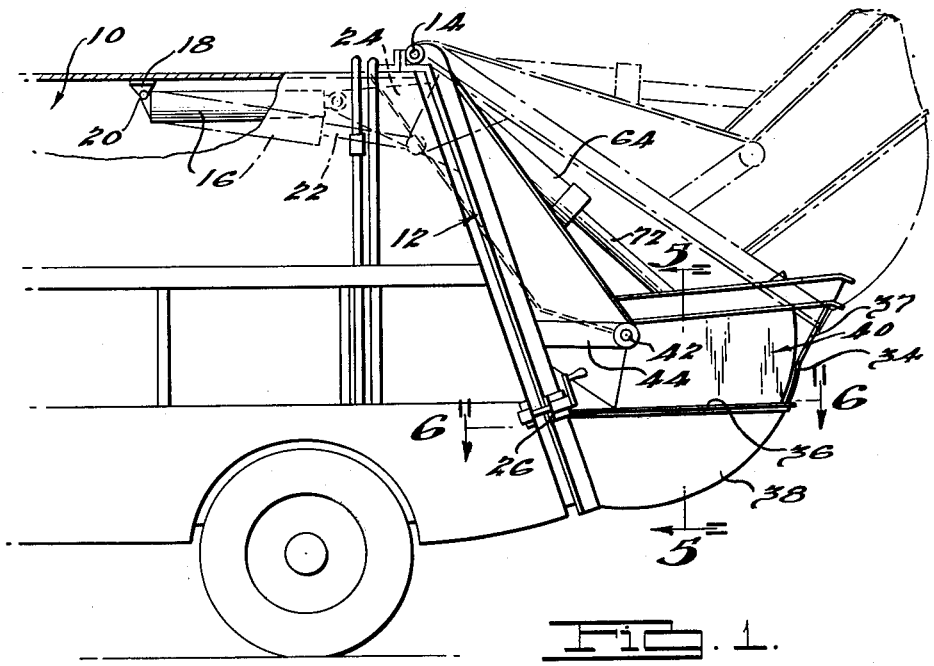
Figure 1 is a fragmentary, side elevational view of a refuse truck body having the improvements of the present invention associated therewith.

Referring to the drawings, a truck body is generally indicated at 10 of the type used for the hauling of refuse. Such truck is provided with a unitary rear door closure generally indicated at 12 which is swingably mounted on pivots 14 along its upper horizontal edge. The pivots 14 are carried by suitable brackets attached to the top rear end of the truck body 10. Such rear closure 12 may be powered open for dumping by means of a hydraulic jack or jacks 16 which may be mounted within the truck body and which include a cylinder pivotally connected to a bracket 18, mounted on the truck body, by means of a pivot pin 20. A ram or piston 22 is associated with the cylinder in the usual way and is pivotally connected to a bracket 24 which is fixed to the inside face of the rear closure 12. Fluid under pressure is supplied the cylinder 16 in the usual way so that by the application of such fluid under pressure the door may be swung from the position shown in full lines to the open position shown in broken lines in Fig. 1.

A suitable releasable latch mechanism 26 is provided at each side of the rear closure 12 and toward the bottom thereof for releasably securing the closure 12 to the truck body.

The rear closure 12 is formed of sheet metal and may be wholly or partially formed in box section for the purpose of strengthening the same so that it may support the operating mechanism thereon in a manner that will be hereinafter described. The rear end of the floor of the vehicle 10 slopes downwardly and rearwardly, as indicated at 30 in Figures 3 and 4. The rear closure 12 extends to the bottom edge of the sloping floor portion 30 and encloses the rear face of the truck. The rear closure 12 is provided with a central opening 32 therethrough, which tapers downwardly and toward the sides of the vehicle adjacent the bottom of the opening. The bottom of the opening is substantially flush with the rear edge of the sloping portion 30 of the truck floor.

A receiver and inlet conduit structure is fixed to the rear face of the closure 12 and comprises a central, curved portion 34 and side receiver portions 36.

Figure 2:
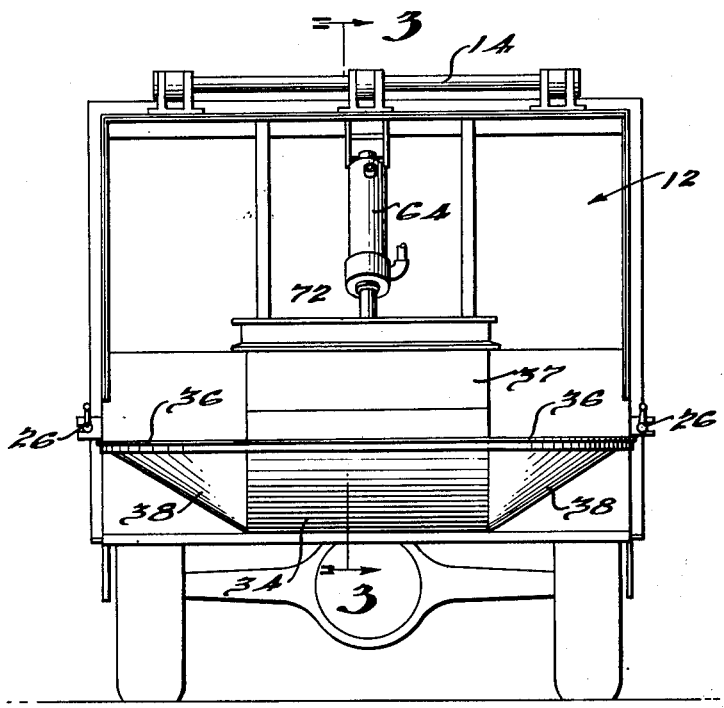
Fig. 2 is a rear elevational view of the structure shown in Fig. 1.

The central portion 34 has a transversely flat bottom and is flared outwardly as indicated at 37 adjacent the upper edge thereof and the bottoms 38 of the side receiver portions 36 slope downwardly and inwardly toward the central portion 34 and toward the inlet 32 so that material deposited into the side receivers 36 will fall by gravity into the central conduit portion 34 and into a portion in front of the inlet opening 32. The top edge of the receivers 36 is relatively low, and is lower than the top edge of the central portion 34, as best shown in Figure 2, so that there is a relatively low lift for depositing the materials into the receivers 36.

An injector element, generally indicated at 40, is mounted within the central portion defined by the wall 34, and is so constructed and operated that materials dumped into the receivers 36 are deposited into the central portion 34 when the injector is moved to its outermost position so that such materials fall within the central portion 34 in a position in front of the front wall of the injector 40. Upon power actuation of the injector inwardly, such materials are forced through the opening 32 into the truck 10.

The injector 40 is pivotally mounted upon a pivot shaft 42, the ends of which may be received within bearings 43 which are fixed to brackets 44. Such brackets 44 may be suitably fixed to the rear face of the closure 12. The pivot shaft 42 extends through tubular members 46, which form a part of the injector 40, for pivotally mounting such injector on the shaft 42.

Figure 6:
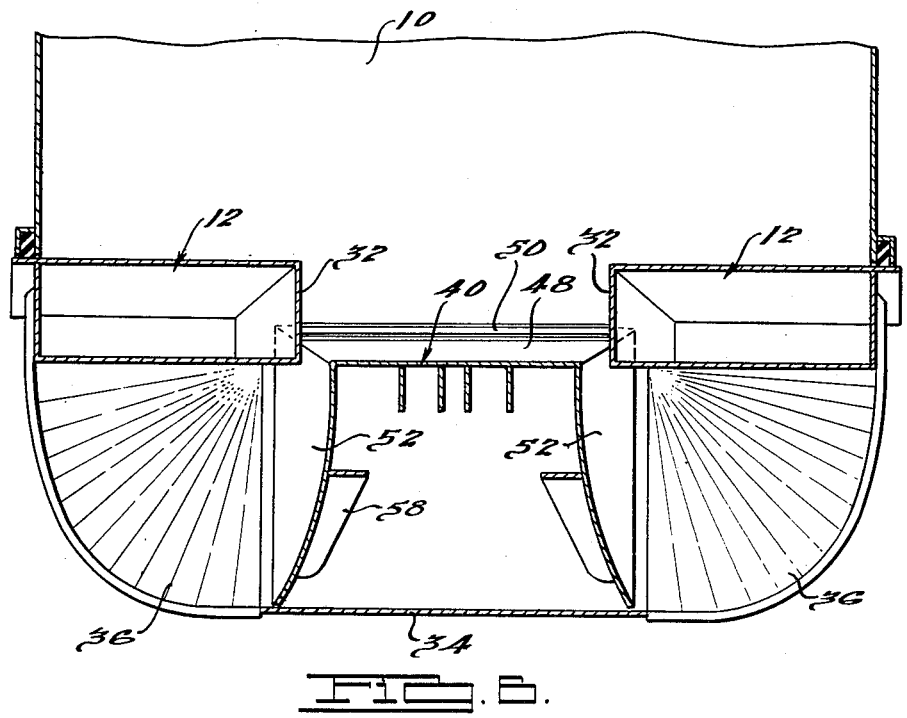
Fig. 6 is a cross-sectional view taken substantially along the line 6—6 of Fig. 1.
Figures 7, 8:
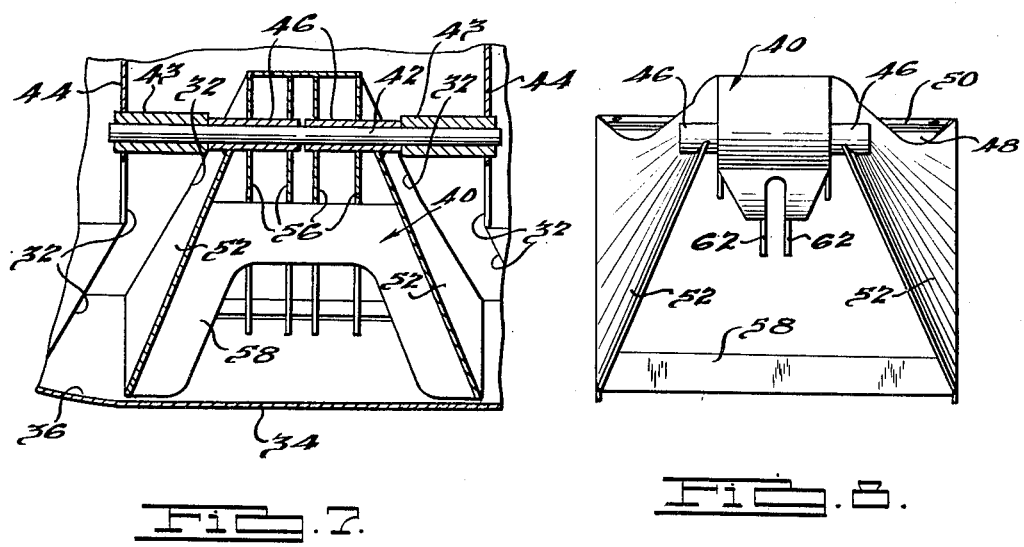
Fig. 7 is a cross-sectional view taken substantially along the line 7—7 of Fig. 3.
Fig. 8 is a plan view of the ram or injector.

The injector 40 includes a front wall 48 having a transversely extending scraper blade 50 secured to the bottom edge thereof. The side edges of such front wall 48 taper upwardly and inwardly, as best shown in Figure 6, to preferably conform to the taper of the walls of opening 32. The injector 40 is provided with side walls 52, which are curved so that they have a surface configuration substantially that of a segment of a cone with the apex substantially at the axial center of the tubular members 46. The injector may be suitably supported and reinforced by rib members 56 and reinforcing plate members 58 which are disposed within the interior of the injector member and engage the front and side walls thereof for the purpose of strengthening and stiffening the same.

The central member 34 is curved on a radius having as its center the axis of the tubular members 46.

The reinforcing members 56 engage the front wall 48 and the inner pair of such members have integral arm portions 62 which form, in effect, a bell crank lever pivoted about the shaft 42. Power means are provided for oscillating the injector about the shaft 42, and such power means include hydraulic means, including a cylinder 64 which is pivotally connected by a pivot pin 66 adjacent its upper end toward bracket 68, which may be fixed to a transversely extending angle plate 70 mounted on the rear face of the closure 12. A piston rod 72 slidably projects through the cap end of the cylinder 64, and is pivotally connected to the arm 62 by means of a pivot pin 74.

Fluid under presure is supplied the cylinder through the ports 76 or 78 at opposite ends thereof for the purpose of powering the injector element in either direction. When one of the ports is the pressure inlet port, the other is, of course, the exhaust port. The conventional source and control for the supply of fluid under pressure to the cylinder and exhaust of fluid therefrom is, of course, used, although such construction is not illustrated in the drawings.

Figure 5:
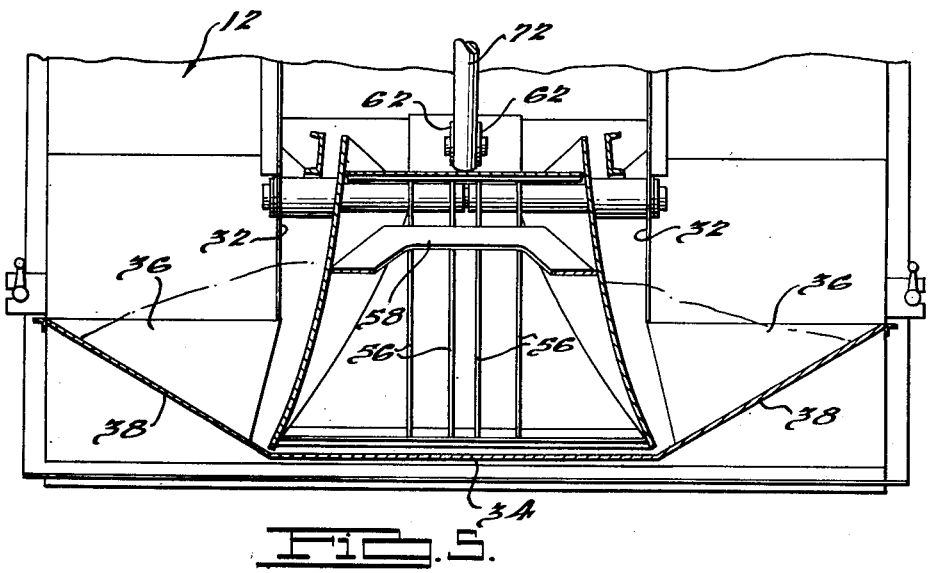
Fig. 5 is an enlarged, cross-sectional view taken substantially along the line 5—5 of Fig. 1.

In the operation of the structure of the present invention, fluid under pressure may be supplied to the opposite ends of the cylinder 64, either continuously or intermittently, as desired. When fluid is supplied continuously, it will be appreciated that the injector element is caused to constantly pivot about the shaft 42 from the position shown in Figure 3 to that shown in Figure 4 and then back again, repeating the cycle of operation as the fluid is supplied. The refuse is dumped into the side receivers 36 and assumes a position such as that shown by the broken lines in Figure 5. It will thus be seen that when the receiver is in the position shown in Figure 3, the material lies against the side walls 52 of the injector 40. As the injector is moved to the position shown in Figure 4, the refuse which is lying against such walls will fall into the central inlet conduit defined by the wall 34 to a position in front of the front wall 58 of the injector. As the injector is then moved from the position shown in Figure 4 to that shown in Figure 3, the material in front of the front wall will be forced through the inlet opening 32 into the truck. Since the injector is power operated, such material may be packed tightly within the truck so that the capacity of the truck is materially increased.

Figures 3, 4:
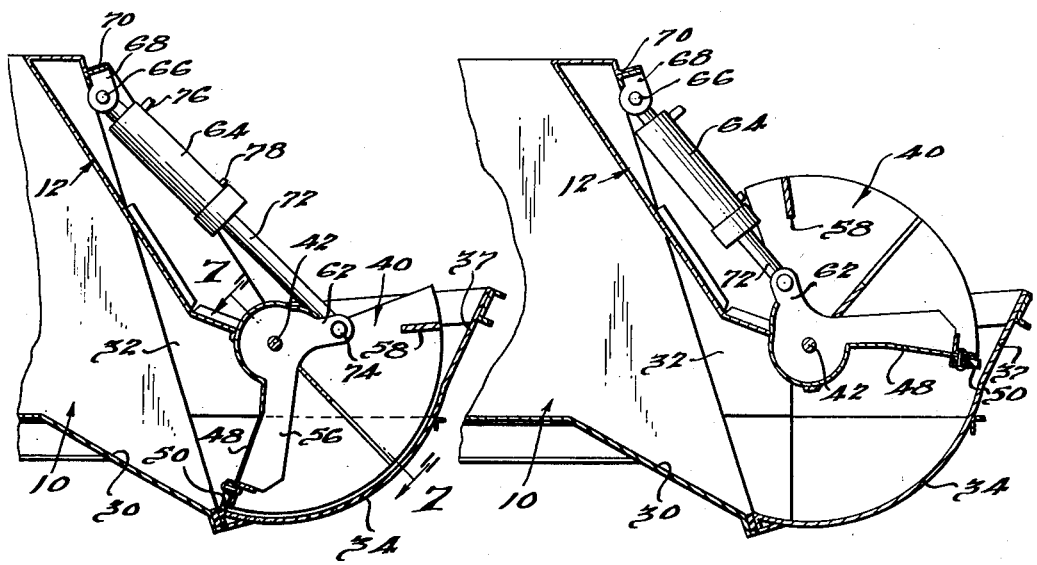
Fig. 3 is a cross-sectional view taken substantially along the line 3—3 of Fig. 2; and showing the packer element in one position.
Fig. 4 is a view similar to Fig. 3, and showing the packer element in another position.

When the injector is moved to the position shown in Fig. 4, it will be seen that the scraper blade is above the beginning of the taper 37. Thus, in this position, there is a space between the blade 50 and the wall 34 along the taper so that any material caught behind the blade may fall down into the inlet conduit to a position in front of the blade.

It will also be appreciated that materials may be loaded into the side receptacles 36, regardless of the position of the injector 40. Thus, the truck may be very quickly loaded with a minimum of effort on the part of the truckman.

What is claimed is:

1. In a material handling truck body, a receptacle, means providing an inlet passage communicating with said receptacle through one wall thereof, a material receiver disposed adjacent said passage and communicable therewith, and a movable packer element disposed within said passage, said element having a side wall adjacent said receiver which slopes downwardly and outwardly toward said receiver so that material deposited within the said receiver lies against said side wall when said element is in one position and drops in front of said element when said element is in another position.

2. In a material handling truck body, a receptacle, means providing an inlet passage communicating with said receptacle through one wall thereof, a material receiver disposed adjacent said passage and communicable therewith, and a movable packer element disposed within said passage, said element having an upstanding side wall adjacent said receiver which slopes downwardly and outwardly toward said receiver so that material deposited within the said receiver lies against said side wall when said element is in one position and drops in front of said element when said element is in another position.

3. In a material handling truck body a receptacle, means providing an inlet passage communicating with said receptacle through one wall thereof, a receiver disposed adjacent each side of said passage and opening thereinto from opposite sides thereof, a movable packer element disposed within said passage, said element having upstanding side walls adjacent said receivers, said side walls sloping downwardly and outwardly toward said receivers so that material deposited within said receivers lies against said side walls when said element is in one position and drops in front of said element when said element is in another position, and power means to move said element from said one position to said another position and back to said one position to force said material into said receptacle.

4. In a material handling truck body, a receptacle, means providing an inlet passage communicating with said receptacle through one wall thereof, a receiver disposed adjacent each side of said passage and opening thereinto from opposite sides thereof, a movable packer element disposed within said passage, said element having upstanding side walls adjacent said receivers, said side walls sloping downwardly and outwardly toward said receivers so that material deposited within said receivers lies against said side walls when said element is in one position and drops in front of said element when said element is in another position, and continuously operable power means to move said element from said one position to said another position and back to said one position.

5. In a material handling truck body, a receptacle, means providing a central inlet passage communicating with said receptacle through one wall thereof, an upwardly opening receiver disposed adjacent each side of said passage, each of said receivers opening into said passage and having bottoms which slope downwardly toward the bottom of said passage, a movable packer element disposed within said passage, said element having upstanding side walls adjacent said receivers which slope downwardly and outwardly toward the bottoms of said receivers so that material deposited within said receivers lies against said side walls when said element is in one position and drops in front of said element when said element is in another position, and power means to move said element between said positions.

6. In a material handling truck body, a receptacle, means providing an inlet passage communicating with said receptacle through one wall thereof, a material receiver disposed adjacent said passage and communicable therewith, a packer element disposed within said receiver, means pivotally mounting said power element, said element having a substantially flat front wall and having a side wall adjacent said receiver which slopes downwardly and outwardly toward said receiver so that material deposited within said receiver lies against said side wall when said element is in one position and drops in front of said element when said element is in another position, and power means to move said element about its pivotal mounting.

7. In a material handling truck body, a receptacle, means providing a central inlet passage communicating with said receptacle through an opening in one wall thereof, said opening having outwardly flared sides adjacent the bottom thereof, an upwardly opening receiver adjacent each side of said passage, each of said receivers being communicable with said passage and having bottoms which slope downwardly toward the bottom of said passage, a power element disposed within said passage, means pivotally mounting said power element adjacent said opening, said power element having a front face which is substantially complementary in shape to the shape of said opening and having side walls which taper downwardly and outwardly toward the bottoms of said receivers so that material deposited within said receivers lies against said side walls when said element is in another position, and power means to swing said element between said positions.

GEORGE B. WOOD.